(12) United States Patent
Yan et al.

(10) Patent No.: US 12,728,924 B2
(45) Date of Patent: Sep. 8, 2026

(54) FRAME SUPPORT APPARATUS

(71) Applicant: Rivian IP Holdings, LLC, Irvine, CA (US)

(72) Inventors: Jin Yan, Aliso Viejo, CA (US); Jagannathan Shankar Mahadevan, Orange, CA (US); Akshat Chauhan, Livonia, MI (US); Christopher Matthews, Huntington Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 506 days.

(21) Appl. No.: 18/341,238

(22) Filed: Jun. 26, 2023

(65) Prior Publication Data

US 2024/0425115 A1 Dec. 26, 2024

(51) Int. Cl.

*B62D 21/15* (2006.01)
*B60K 1/04* (2019.01)
*B62D 25/02* (2006.01)
*H01M 50/242* (2021.01)

(52) U.S. Cl.

CPC ................ *B62D 21/15* (2013.01); *B60K 1/04* (2013.01); *B62D 21/157* (2013.01); *B62D 25/025* (2013.01); *H01M 50/242* (2021.01); *B60K 2001/0438* (2013.01)

(58) Field of Classification Search

CPC ...... B62D 21/15; B62D 21/157; B62D 25/02; B62D 25/025; B60R 19/18; B60R 2019/182; B60R 2019/1833; H01M 50/242

USPC ................. 296/187.12, 193.05, 203.03, 209; 293/102, 126, 128, 132; 180/68.5

See application file for complete search history.

(56) References Cited

U.S. PATENT DOCUMENTS 10,720,620 B1 * 7/2020 Grace ................. H01M 50/244
11,634,002 B2 * 4/2023 Noh ................... B62D 25/2027 280/124.128
11,801,742 B2 * 10/2023 Yaita ..................... B60L 3/0046
12,115,847 B2 * 10/2024 Shynn ................... B60L 3/0007
2007/0039282 A1 * 2/2007 Holl ........................ B60R 19/18 52/843
2007/0246956 A1 * 10/2007 Nagai ..................... B60R 19/18 293/155
2015/0176673 A1 * 6/2015 Kaneko ............... B62D 21/157 188/377
2016/0311301 A1 * 10/2016 Ikeda ................... B62D 29/001
2018/0065667 A1 * 3/2018 Maier .................. B62D 21/157
2018/0148106 A1 * 5/2018 Ayukawa .............. B62D 25/20
2021/0146766 A1 * 5/2021 Haberl ..................... B60K 1/04
2024/0351636 A1 * 10/2024 Ignes ..................... B62D 21/15
2024/0375501 A1 * 11/2024 Jeong ................... B62D 25/145

* cited by examiner

*Primary Examiner* — Amy R Weisberg
*Assistant Examiner* — Denise Lynne Esquivel
(74) *Attorney, Agent, or Firm* — Foley & Lardner LLP

(57) ABSTRACT

An apparatus can include a body having a plurality of walls dividing the body into a plurality of sections along a height of the body. A first wall and an opposing second wall can define a section of the plurality of sections. A middle portion of the first wall can be disposed closer to the second wall in a first direction than an end portion of the first wall. The first wall and the second wall can move towards each other in the first direction in response to a force applied on the body in a second direction.

20 Claims, 9 Drawing Sheets

FRAME SUPPORT APPARATUS

INTRODUCTION

Electric vehicles can include various electrical components that provide power to the vehicle. The electrical components can be electrically coupled with vehicle components to power the vehicle.

SUMMARY

A vehicle frame rail support apparatus can include a body having a plurality of sections divided by walls. At least two of the walls can buckle and move towards each other in response to a force applied on the body to support the structure of the body. The two walls can at least partially contact one another when the walls move toward each other. The disclosed solutions have a technical advantage of absorbing energy of a force applied to the body to facilitate minimizing an amount of force applied to a battery positioned adjacent to or near the body. For example, the contact between the bowed walls can facilitate providing support for the body and distributing the load throughout the body to facilitate absorbing the energy of the force. The body can include a plurality of second sections connected with the body. The second sections can be disposed between the sections of the body and a battery pack to further facilitate absorbing the energy of the force applied to the body.

At least one aspect is directed to an apparatus. The apparatus can include a body having a plurality of walls dividing the body into a plurality of sections along a height of the body. A first wall and an opposing second wall can define a section of the plurality of sections. A middle portion of the first wall can be disposed closer to the second wall in a first direction than an end portion of the first wall. The first wall and the second wall can move towards each other in the first direction in response to a force applied on the body in a second direction.

At least one aspect is directed to a vehicle. The vehicle can include an apparatus. The apparatus can include a body having a plurality of walls dividing the body into a plurality of sections along a height of the body. A first wall and an opposing second wall can define a section of the plurality of sections. A middle portion of the first wall can be disposed closer to the second wall in a first direction than an end portion of the first wall. The first wall and the second wall can move towards each other in the first direction in response to a force applied on the body in a second direction.

At least one aspect is directed to an apparatus. The apparatus can include a body having a plurality of walls dividing the body into a plurality of first sections and a plurality of second sections. A first wall and an opposing second wall can define a section of the plurality of first sections. A middle portion of the first wall can be disposed closer to the second wall in a first direction than an end portion of the first wall. The first wall and the second wall can move towards each other in the first direction in response to a force applied on the body in a second direction.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
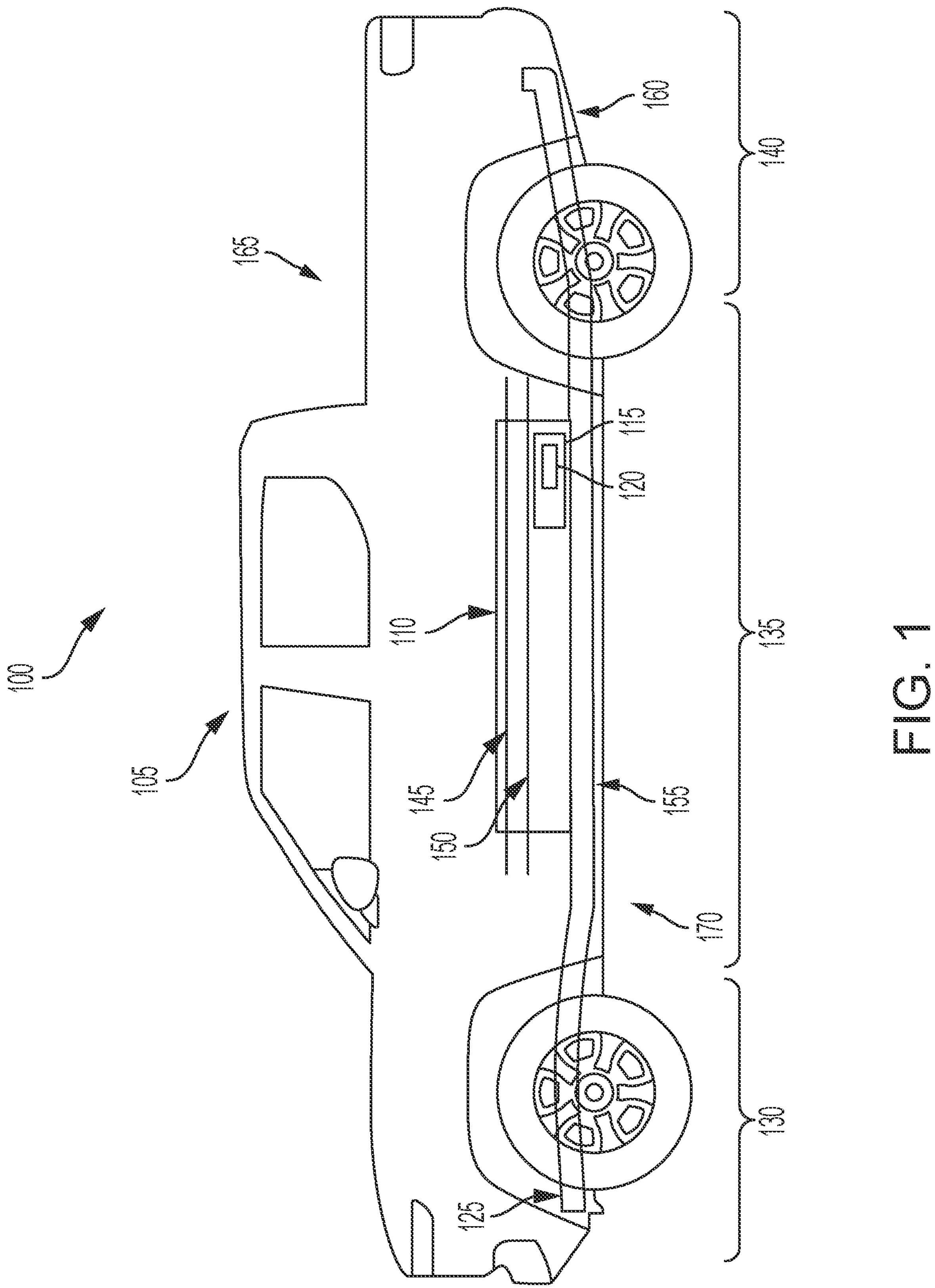
FIG. 1 depicts an example side view of an electric vehicle, in accordance with implementations.

Following below are more detailed descriptions of various concepts related to, and implementations of, methods, apparatuses, and systems of a vehicle frame rail support apparatus. The apparatus can at least partially crumple or buckle to absorb energy of a force applied at least at a portion of a vehicle frame, as described herein. The apparatus can include at least one body. The body can include a plurality of walls that divides the body into first or second sections (e.g., generally rectangular sections). At least one first section can include two walls (e.g., a top wall and a bottom wall) that are structured to at least partially bias towards one another. The two walls can be structured to bend or bow towards one another when a force is applied to the body. The two walls can contact one another at or near a center of the first section to facilitate distributing the load of the force applied on the body throughout the body (e.g., by forming two generally triangular shaped sections from the rectangular section). The body can be disposed at or near a vehicle frame rail (e.g., the rocker panel) to support the frame rail when, for example, a force is applied to the frame rail. The various concepts introduced above and discussed in greater detail below may be implemented in any of numerous ways.

The present disclosure is directed to systems and methods of a vehicle frame rail support apparatus. The apparatus can include a body having a plurality of first sections. A plurality of walls can divide the first sections along the height of the body. At least two of the walls can bow towards each other (e.g., buckle) and can move toward each other in response to a force applied on the body to support the structure of the body. A first wall of the at least two walls can include a first protrusion and a second wall of the at least two walls can include a second protrusion. The first protrusion and the second protrusion can at least partially contact one another when the walls move toward each other.

The disclosed solutions have a technical advantage of absorbing energy of the force applied to the body to facilitate minimizing an amount of force applied to a battery positioned adjacent to or near the body. For example, the contact between the first protrusion and the second protrusion can facilitate distributing a load of the force throughout the body. For example, a wall of the body can receive a first force level as the two walls move toward each other and a second force level after the first protrusion contacts the second protrusion, in which the second force level is greater than the first force level. In other words, the body can distribute the load throughout the body to facilitate absorbing the energy of the force. The body can include a plurality of second sections coupled with the body. The second sections can be disposed between the sections of the body and a battery pack to further facilitate absorbing the energy of the force applied to the body. The body can include an extrusion made from aluminum to facilitate buckling, crumpling, and absorbing energy.

FIG. 1 depicts an example cross-sectional view 100 of an electric vehicle 105 installed with at least one battery pack 110. Electric vehicles 105 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
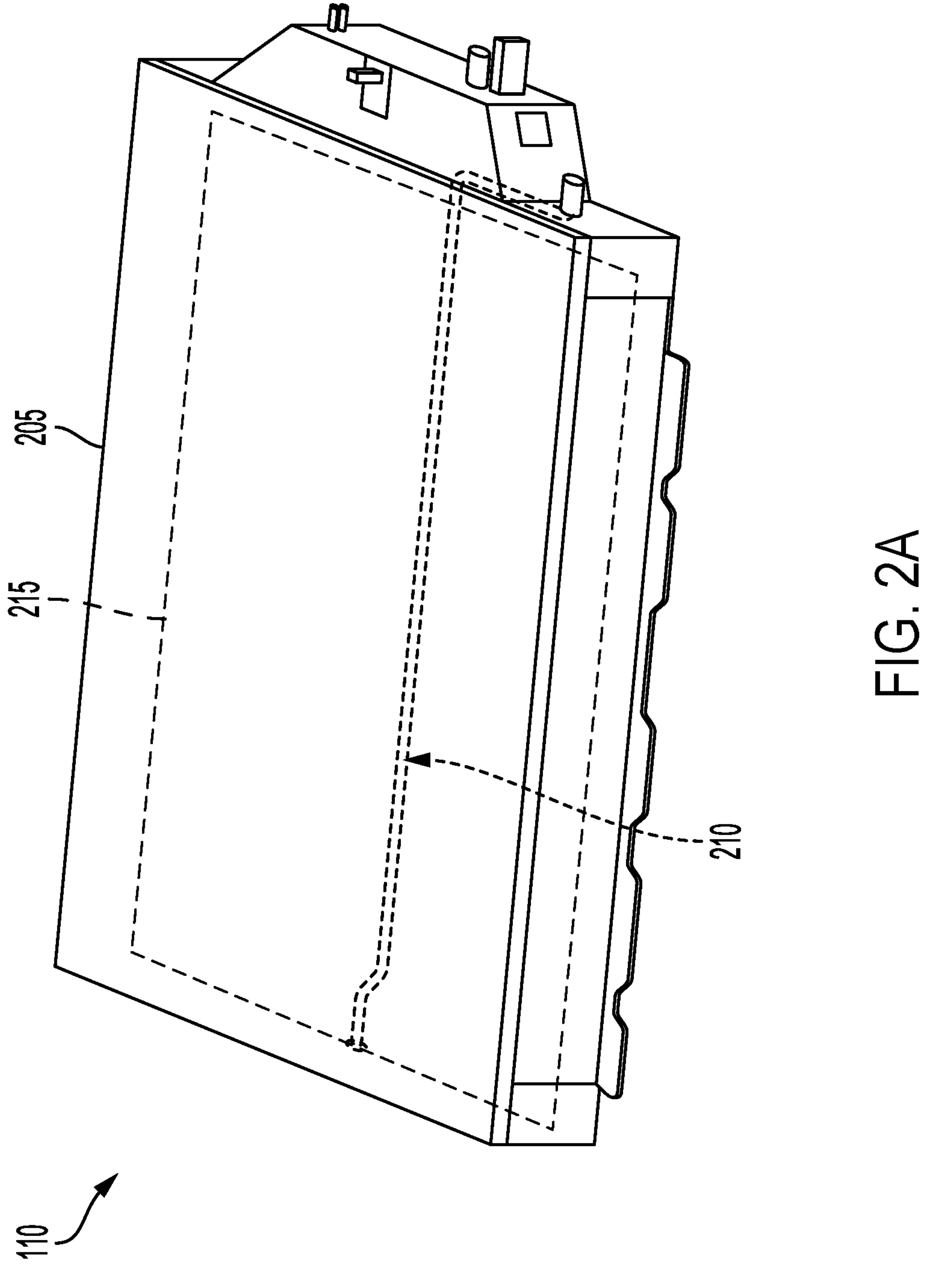
FIG. 2A depicts an example perspective view of a battery pack, in accordance with implementations.

FIG. 2A depicts an example battery pack 110. Referring to FIG. 2A, among others, the battery pack 110 can provide power to electric vehicle 105. Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
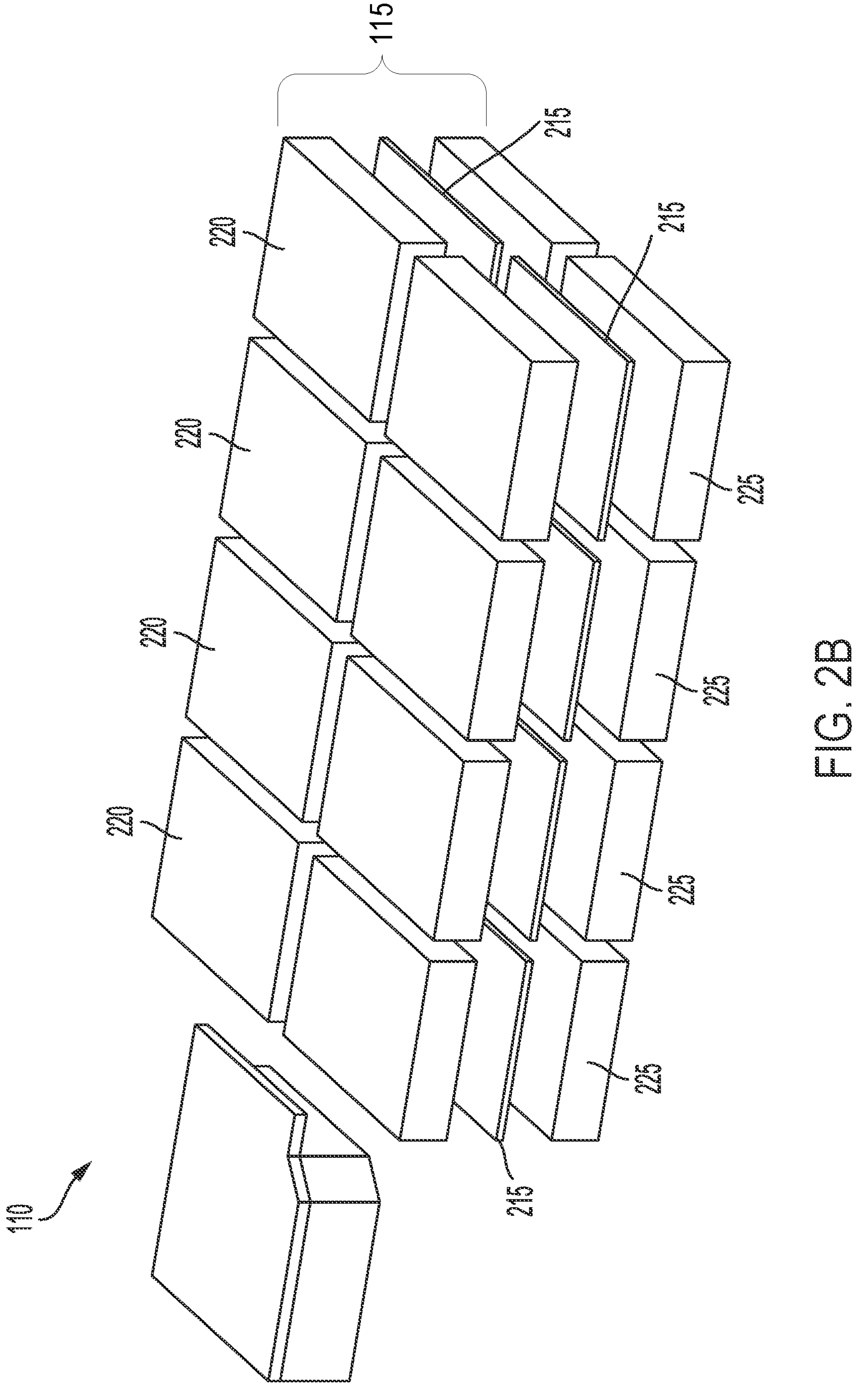
FIG. 2B depicts an example perspective view of a battery module, in accordance with implementations.

FIG. 2B depicts example battery modules 115, including one or more battery cell s120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The thermal components 215 shown adjacent to each other can be combined into a single thermal component 215 that spans the size of one or more submodules 220 or 225. The thermal component 215 can be positioned underneath submodule 220 and over submodule 225, in between submodules 220 and 225, on one or more sides of submodules 220, 225, among other possibilities. The thermal component 215 can be disposed in sidewalls, cross members, structural beams, among various other components of the battery pack, such as battery pack 110 described above. The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205.

Each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120. It should be noted the illustrations and descriptions herein are provided for example purposes and should not be interpreted as limiting. For example, the battery cells 120 can be inserted in the battery pack 110 without battery modules 220 and 225. The battery cells 120 can be disposed in the battery pack 110 in a cell-to-pack configuration without modules 220 and 225, among other possibilities.

Battery cells 120 have a variety of form factors, shapes, or sizes. For example, battery cells 120 can have a cylindrical, rectangular, square, cubic, flat, pouch, elongated or prismatic form factor.

Figure 3:
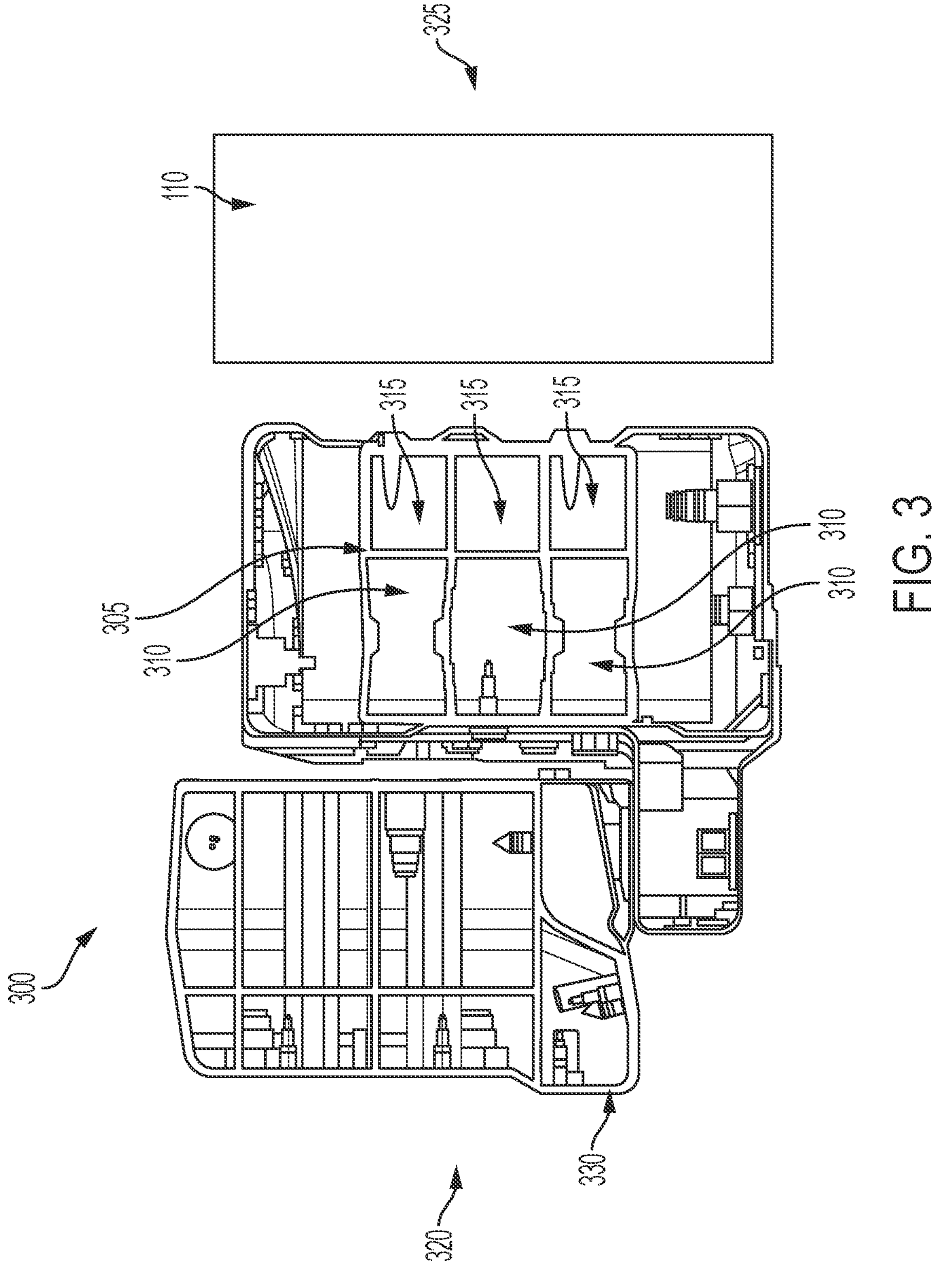
FIG. 3 depicts an example front view of a frame support apparatus positioned adjacent to a battery pack of the electric vehicle of FIG. 1, in accordance with implementations.

FIG. 3 depicts an example front view of an apparatus 300. The apparatus 300 can include or be disposed in a portion of the vehicle 105. For example, the apparatus 300 can include or can position adjacent to a portion of a rocker panel 155 of the vehicle 105 (e.g., at or near a side of the vehicle 105, under a door, between the front and rear wheels, etc., as depicted in at least FIG. 1). For example, the apparatus 300 can include or can be positioned within a portion of a frame rail 160 of the vehicle 105 (e.g., the skateboard or frame that supports one or more components of the vehicle 105). The apparatus 300 can facilitate supporting the rocker panel 155 (e.g., of the frame rail 160, depicted in at least FIG. 1) of the vehicle 105 when a force is applied to the rocker panel 155, as described herein. The apparatus 300, or a portion of the apparatus 300, can couple with the vehicle 105 through various means including, but not limited to, fasteners.

The apparatus 300 can include a first end 320 and a second end 325. The first end 320 of the apparatus 300 can be located at or near a side-most portion of the vehicle 105 (e.g., at or beneath a door of the vehicle 105, at a first side 170 of the vehicle 105, directly adjacent to a rocker panel 155 of the vehicle 105, as depicted in FIG. 1). The second end 325 can at least partially oppose the first end 320 and can be located near the center of the vehicle 105 (e.g., adjacent to the battery pack 110, closer to the second side 165 of the vehicle 105, as depicted in FIG. 1). For example, the vehicle 105 can include a first apparatus 300 disposed adjacent a frame rocker panel 155 of a first side 170 of the vehicle 105 and a second apparatus 300 disposed adjacent a frame rocker panel 155 of a second side 165 of the vehicle 105 with the battery pack 110 being disposed between the first and second apparatuses 300. The apparatus 300 can include a body 305 disposed at or near the second end 325 of the apparatus 300 (or at or near the first end 320).

As described herein, the body 305 can include a plurality of walls dividing the body 305 into a plurality of sections along a height (e.g., height direction 455 depicted in at least FIG. 4) of the body 305. For example, the body 305 can include at least one first section 310. The body 305 can include a plurality of first sections 310 (e.g., one first section 310, two first sections 310, three first sections 310, or more than three first sections 310, along a height of the body 305, each divided by one or more respective walls). The apparatus 300 can include at least one second body 330 positioned adjacent to or near the body 305. The body 305 can be monolithically formed with the second body 330, or the second body 330 can be formed independently and coupled with the body 305 within the vehicle 105. The second body 330 can include a plurality of sections that can at least partially deform responsive to a force applied to the second body 330.

The body 305, or another portion of the apparatus 300, can include at least one second section 315. For example, the apparatus 300 can include a plurality of second sections 315 that are each positioned adjacent to a respective first section 310 in the direction towards the second end 325 of the apparatus 300. In some examples, at least one second section 315 can be positioned adjacent to a first section 310 in the direction towards the first end 320 of the apparatus 300. The body 305 can include each of the first sections 310 and second sections 315 monolithically formed with one another (e.g., such that each of the plurality of first sections 310 have an adjoining wall with one of the plurality of second sections 315), or the second sections 315 can be independent of the body 305 and positioned adjacent to the body 305 (e.g., coupled with the body 305). Each of the first sections 310 and second sections 315 can be made of the same material, or at least one of the second sections 315 can at least partially or entirely differ in material from at least one of the first sections 310. The apparatus 300 can include the same number of second sections 315 as first sections 310 (e.g., to define six sections total as depicted in the figures), or the apparatus 300 can include a different number of second sections 315 and first sections 310. For example, the body 305 can include a plurality of second sections 315 (e.g., one second section 315, two second sections 315, three second sections 315, or more than three second sections 315).

The body 305 can be formed through various different manufacturing processes. For example, the body 305 can be or can include an extrusion. For example, the body 305 can be at least partially formed via an extrusion process to form the one or more first sections 310 or second sections 315. The body 305, or one or more parts of the body 305, can be formed of various metallic materials including, but not limited to, aluminum or steel. The body 305 can additionally or alternatively include various non-metallic materials including, but not limited to, plastic. One or more portions of the apparatus 300 can be formed using one or more additional or alternative manufacturing processes including, but not limited to, additive manufacturing, stamping, or other processes.

Figure 4:
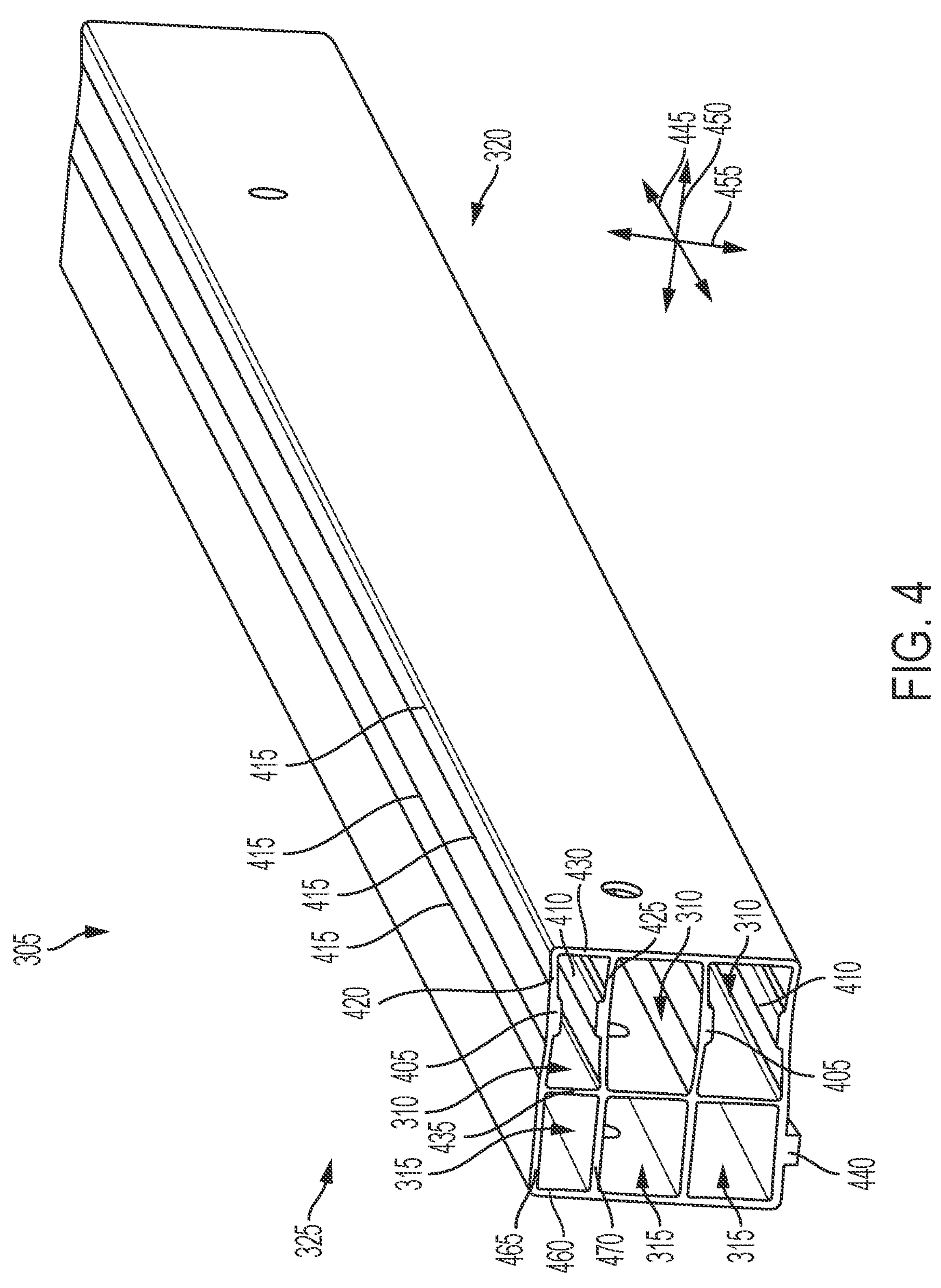
FIG. 4 depicts an example perspective view of a portion of the apparatus of FIG. 3, in accordance with implementations.
Figure 5:
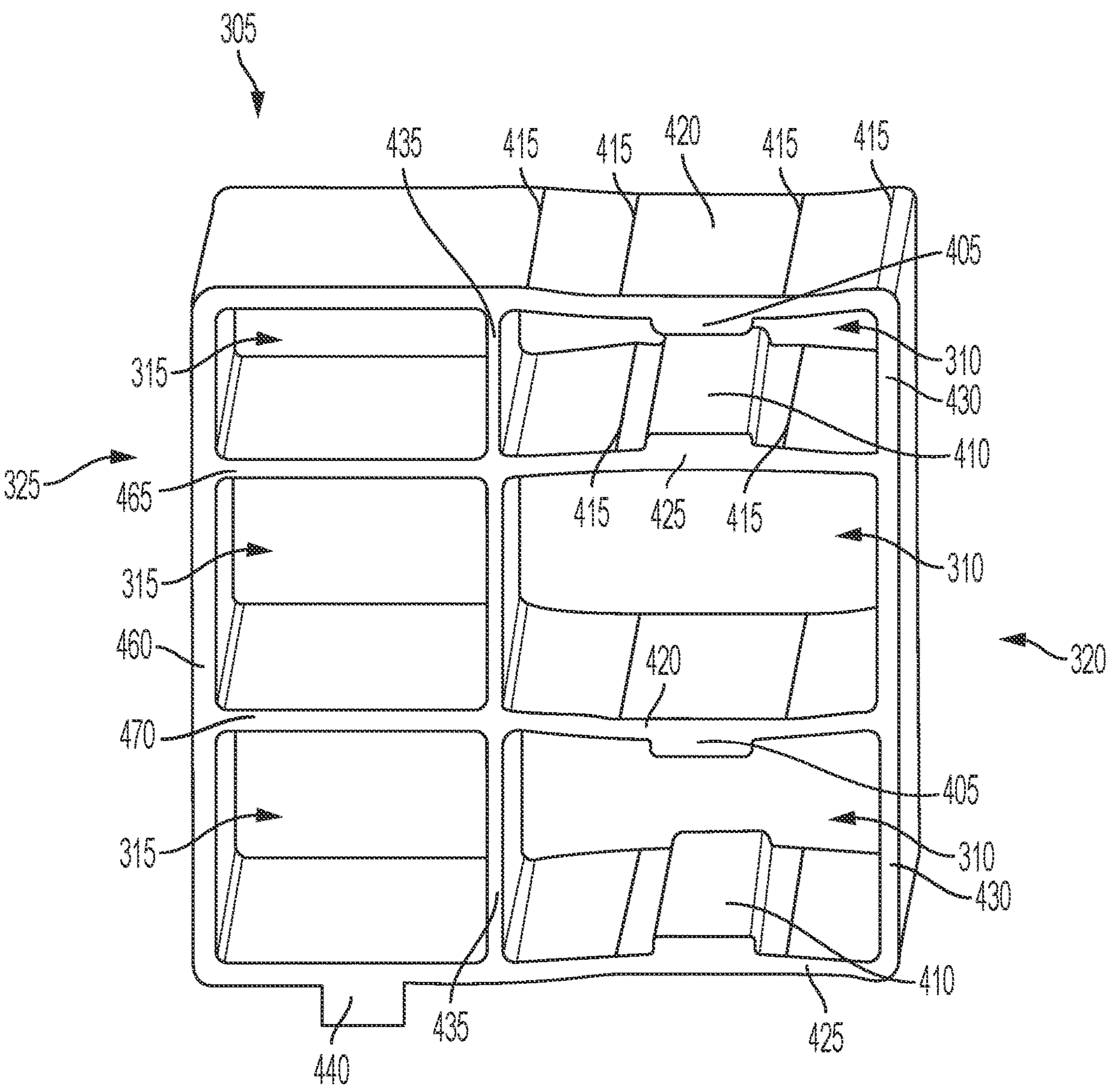
FIG. 5 depicts an example front view of a portion of the apparatus of FIG. 3, in accordance with implementations.

FIG. 4 depicts an example perspective view of the body 305 of the apparatus 300 and FIG. 5 depicts an example front view of the body 305. The body 305 can be formed via an extrusion process such that the body 305 extends longitudinally along a portion of the vehicle 105 (e.g., at least partially between a front end of the vehicle 105 and a rear end of the vehicle 105). For example, the body 305 can extend longitudinally in a length direction 445, as depicted in FIG. 4. Each of the first sections 310 or the second sections 315 can extend longitudinally at least partially or entirely the longitudinal length of the body 305 (e.g., between a front end of the vehicle 105 and a rear end of the vehicle 105) in the length direction 445.

As depicted in FIGS. 4 and 5, and among others, the body 305 can include a plurality of walls (e.g., walls 420, 425, 430, 435, 460, 465, 470, or adjoining walls described or shown herein) that can divide the body 305 into the first sections 310 or the second sections 315 in height, length, or width of the body 305. For example, the plurality of walls of the body 305 can divide the body into the first sections 310 in a height direction 455 (e.g., such that the first sections 310 are at least partially stacked on top of one another). For example, at least one first section 310 can include a first wall 420, an opposing second wall 425, a third wall 430 that extends at least partially between the first wall 420 and the second wall 425, and a fourth wall 435 that opposes the third wall 430. Each of the walls can be monolithically formed with one another. The first wall 420 and the second wall 425 can include a larger width (e.g., in a width direction 450, in a direction from the second end 325 towards the first end 320 of the apparatus) than a height of the third wall 430 and fourth wall 435 (e.g., in the height direction 455) to form a substantially rectangular shape. In other words, at least one first section 310 can include an aspect ratio between 1:1 and 10:1 (e.g., 2:1, 3:2, etc.). The first section 310 can include a larger or smaller aspect ratio (e.g., less than 1:1 or more than 10:1). The body 305 of the apparatus 300 can include a greater height than width. In other words, the body 305 can include an aspect ratio between 1:10 and 1:1 (e.g., 1:2, 2:3, etc.). The body 305 can include a larger or smaller aspect ratio (e.g., less than 1:10 or more than 1:1).

The first wall 420 (or the second wall 425) can extend from one end portion to another end portion (e.g., from an end connected to the third wall 430 to another end connected to the fourth wall 435). A middle portion of the first wall 420 (e.g., a midpoint between the third wall 430 and the fourth wall 435) can be positioned closer to the second wall 425 in a first direction (e.g., in the height direction 455 as shown and described herein) than the end portions of the first wall 420. For example, the first wall 420 can be bowed, bent, curved, pointed, or otherwise shaped such that at least a portion of the middle of the first wall 420 is closer in position to the second wall 425 than another portion of the first wall 420. A middle portion of the second wall 425 (e.g., a midpoint between the third wall 430 and the fourth wall 435) can be positioned closer to the first wall 420 than the end portions of the second wall 425. For example, the second wall 425 can be bowed, bent, curved, pointed, or otherwise shaped such that at least a portion of the middle of the second wall 425 is closer in position to the first wall 420 than another portion of the second wall 425.

As described herein, at least two of the plurality of walls (e.g., first wall 420 and second wall 425) can bow towards each other or move towards each other in the first direction (e.g., in the height direction 455) in response to a force applied to the body 305 (e.g., responsive to a force applied to a portion of the frame rail 160 of the vehicle 105) in a second direction (e.g., a direction that may be non-parallel with the height direction 455, such as substantially in the width direction 450 described herein, in the length direction 445 described herein, or in another direction). The at least two of the plurality of walls (e.g., the first wall 420 and the second wall 425) can include a protrusion. For example, at least one first section 310 can include at least one protrusion on one or more walls. For example, at least one of the first sections 310 can include a first protrusion 405 and a second protrusion 410. The first protrusion 405 can protrude from an inner surface of the first wall 420 of the first section 310 and the second protrusion 410 can protrude from the opposing inner surface of the second wall 425. The first protrusion 405 can contact the second protrusion 410 responsive to a force applied on the body 305. The first protrusion 405 or the second protrusion 410 can include faces or surfaces that are flat (e.g., at an angle matching that of wall 465 or perpendicular to wall 435) even when the respective first wall 420 or second wall 425 are bowed (e.g., to contact one another along a flat plane).

Figure 7:
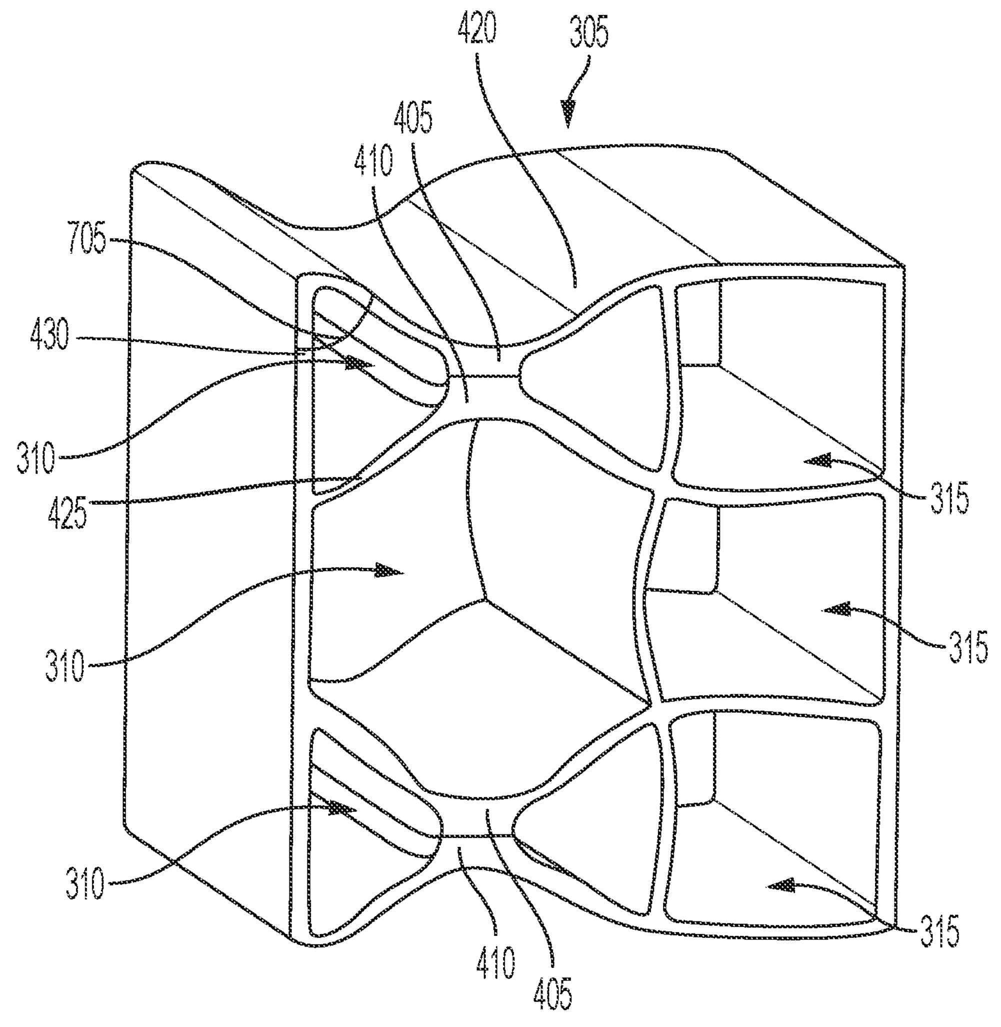
FIG. 7 depicts an example perspective view of a portion of the apparatus of FIG. 3 in a second state, in accordance with implementations.

As depicted in the figures, the first protrusion 405 and the second protrusion 410 can extend from the respective first wall 420 and second wall 425 at approximately (e.g., +10%) the center of the walls in the width direction 450. The first protrusion 405 can substantially oppose the second protrusion 410, or the first protrusion 405 can be offset from the second protrusion 410 in the height direction 455. The first protrusion 405 can extend longitudinally along the first wall 420 in the length direction 445 and the second protrusion 410 can extend longitudinally along the second wall 425 in the length direction 445. One or more of the first sections 310 can have no protrusions. For example, every other first section 310 in a height direction 455 can include protrusions (e.g., the first protrusion 405 or second protrusion 410), and every section in between can include no protrusions, as depicted throughout the figures. In other words, each first section 310 having at least two walls (e.g., first wall 420 and second wall 425) that can bow towards each other can include at least one protrusion on an inner surface of the respective wall. The outer surface of the respective walls (e.g., the outer surface of the first wall 420 or the second wall 425) can include no protrusions. The first sections 310 that include no protrusions on the inner surfaces of the first section 310 can be larger than or equal in size (e.g., area or volume) than the first sections 310 that include protrusions. For example, as the first wall 420 or second wall 425 moves inward into a portion of one first section 310, the same wall can move outward away from a portion of another first section 310 (e.g., the immediate first section 310 in a height direction 455) to define a greater open space within the section 310 that is free of protrusions (e.g., as depicted in FIG. 7).

Each wall of the first wall 420, the second wall 425, the third wall 430, or the fourth wall 435 of the first section 310 can include about the same thickness. For example, the thickness can range between 1 mm and 5 mm (e.g., the thickness can be 2.5 mm). One or more of the walls can include a different thickness. The thickness can be substantially greater or lesser than between 1 mm and 5 mm. For example, the thickness can be less than 1 mm (e.g., 0.5 mm) or greater than 5 mm (e.g., 10 mm). The small thickness of the walls of the first section 310 can facilitate increasing manufacturability while reducing excess materials.

The first protrusion 405 can protrude from the inner surface of the first wall 420 a distance in the range of 1 mm to 5 mm, or the first protrusion 405 can protrude from the inner surface of the first wall 420 substantially greater or lesser than between 1 mm and 5 mm. The second protrusion 410 can protrude from the inner surface of the second wall 425 a distance in the range of 1 mm to 5 mm, or the second protrusion 410 can protrude from the inner surface of the second wall 425 substantially greater or lesser than between 1 mm and 5 mm.

A portion of at least one first section 310 of the body 305 can be structured to facilitate causing the first protrusion 405 to move towards the second protrusion 410 (or the second protrusion 410 to move towards the first protrusion 405) when a force is applied at or near the third wall 430 (e.g., substantially in the width direction 450, from the first end 320 of the apparatus 300 towards the second end 325). For example, the first wall 420 or the second wall 425 of the first section 310 can include at least one divot 415 that can cause the first wall 420 or the second wall 425 to bow towards each other (e.g., buckle) in response to a force applied on the body 305. The first wall 420 can include a first divot 415 positioned on a first side of the first protrusion 405 in the width direction 450 and a second divot 415 positioned on a second side of the first protrusion 405 in the width direction 450. The first wall 420 can have a third divot 415 at a first end of the first section 310 in the width direction 450 (e.g., adjacent a second section 315) and a fourth divot 415 at another end of the first section 310 in the width direction 450. In some examples, the first wall 420 or the second wall 425 may not include any divots 415.

The divots 415 can include a discontinuity in the wall (e.g., a partial cut, slot, opening) that can facilitate reducing a rigidity of the first wall 420 or increasing a flexibility of the wall 420. For example, as depicted in the figures, the divots 415 can facilitate (or further facilitate) biasing the first protrusion 405 towards a center of the first section 310 (e.g., by causing the first wall 420 to slightly bow, fold, or bend towards the center due to the divots 415). The second wall 425 can include one or more divots 415 positioned similarly relative to the second protrusion 410 to cause the second wall 425 to bow and bias the second protrusion 410 towards a center of the first section 310 (e.g., by causing the second wall 425 to slightly fold or bend towards the center). The divots 415 may or may not facilitate biasing the first wall 420 or the second wall 425. For example, the divots 415 can facilitate movement of the protrusions 405, 410 towards one another when a force is applied to the body 305, but may or may not contribute to the shape of the first wall 420 or the second wall 425 when the body 305 is static. In examples without divots 415 (not shown), the movement of protrusions 405, 410 towards one another when a force is applied to the body 305 is facilitated by the shape (e.g., the bowed shape) of first wall 420 or second wall 425, as discussed with reference to FIG. 4 above.

When a force is applied at or near the third wall 430 (e.g., in a direction from the first end 320 of the apparatus 300 or from the second end 325 of the apparatus 300), the force can further facilitate causing the first wall 420, and the first protrusion 405, to bow or bend towards the second wall 425 and the second protrusion 410. For example, the bowed shape or divots 415 of the first section 310 encourage the first wall 420 to buckle or the second wall 425 to buckle towards one another with a force applied on the body 305. With this buckling, the first protrusion 405 can at least partially contact the second protrusion 410. The first wall 420 or the second wall 425 may not include any protrusions 405, 410 such that the buckling causes a portion of the first wall 420 and the second wall 425 to contact directly (e.g., with or without the protrusions 405, 410).

The buckling of the first wall 420 and the second wall 425 towards one another when a force is applied to the body 305 can facilitate the body 305 absorbing energy of a force applied to the body 305 and distributing the load of the force throughout the body 305 by providing additional stability to the structure of the body 305, for example, after the first wall 420 and second wall 425 make contact (e.g., at first protrusion 405 and second protrusion 410). For example, at a first time instance in which an initial force is applied to the body 305 substantially parallel to the width direction 450, the fourth wall 435 of the one or more first sections 310 can have a first proportion of an overall force of the body 305 applied. At a second time instance when the first wall 420 and the second wall 425 move towards each other such that the first protrusion 405 is about to contact the second protrusion 410, the fourth wall 435 can have a second proportion of an overall force of the body 305 applied. At a third time instance after first protrusion 405 contacts the second protrusion 410, the fourth wall 435 can have a third proportion of an overall force of the body 305 applied. Accordingly, the first wall 420 and the second wall 425 (e.g., at the first protrusion 405 and second protrusion 410) facilitate distributing a lateral force load (e.g., along the width direction 450) throughout the first section 310 to reduce or distribute a portion of the overall force applied to the fourth wall 435 over time (e.g., to reduce a potential force applied to the battery pack 110 adjacent or in line with the fourth wall 425).

The body 305 can absorb energy of a force such that the body 305 facilitates preventing or significantly reducing a likelihood of deforming a battery pack 110 of the vehicle 105 disposed adjacent to the body 305 responsive to the force. For example, the first wall 420 and the second wall 425 of the first section 310 can allow for crumpling or buckling to facilitate absorbing energy of a force, while the contact between the first protrusion 405 and the second protrusion 410 facilitates increasing a stability of the structure of the body 305. For example, the protrusions 405, 410, and the bowed first wall 420 and second wall 425 can offset a neutral buckling axis which can define a specific direction of buckling and therefore reduce or eliminate an uncontrolled buckling of the body 305. As described herein, the body 305 can form one or more stable triangular sections responsive to a force on the body 305, which can cause a secondary peak reaction force during load displacement. The material, geometry, and structure of the body 305 can facilitate absorbing energy of a force applied to the body 305. For example, forming the body 305 at least partially via extrusion using aluminum can allow for a high energy absorption of the material when a force is applied to the body 305. For example, the body 305 provides for a high amount of energy absorption with having six total sections (e.g., three first sections 310 and three second sections 315) having a relatively low thickness of walls (e.g., between 1 mm and 5 mm), as opposed to a body having more sections at a higher thickness of walls. Additionally, the aspect ratio of the first sections 310 can allow for the contact between the protrusions 405, 410, which can provide a secondary reaction when a force is applied to the body 305, which in turn can provide additional support to the body 305 when the force is applied.

The one or more second sections 315 can join with the first sections 310 at a shared wall. For example, each of the plurality of second sections 315 can include one or more parallel walls (e.g., first parallel wall 465 and second parallel wall 470). The first parallel wall 465 of one second section 315 can be joined at an end of the first wall 420 of a first section 310 and the second parallel wall 470 of the one second section 315 can be joined at an end of the second wall 425 of the first section 310. For example, the first parallel wall 465 can be monolithically formed with the first wall 420, and the second parallel wall 470 can be monolithically formed with the second wall 425. In some examples, the first parallel wall 465 can be independently formed from and coupled with the first wall 420, and the second parallel wall 470 can be independently formed from and coupled with the second wall 425. The first parallel wall 465 can be substantially parallel to the first wall 420 (e.g., when the first wall 420 is not moving towards the second wall 425) and the second parallel wall 470 can be substantially parallel to the second wall 425 (e.g., when the second wall 425 is not moving towards the first wall 420).

At least one second section 315 can be defined by the fourth wall 435 of at least one first section 310 such that the second section 315 can be located adjacent to the first section 310. The second sections 315 can include at least one wall with a greater thickness than a wall of the first section 310. For example, the first parallel wall 465, the second parallel wall 470, or a second section wall 460 extending between the first and second parallel walls can include a thickness that is greater than or equal to the third wall 430 or the first wall 420 of at least one first section 310. For example, the second section wall 460 (or the first parallel wall 465 or the second parallel wall 470) can be in the range of 2 mm and 6 mm (e.g., 3 mm). At least one wall of at least one second section 315 may include no divots 415 (e.g., be a substantially planar or bowed surface) such that at least one wall of the second section 315 includes a higher stiffness than the first wall 420 or the second wall 425 of the first section 310. With this configuration, the second sections 315 can facilitate providing additional stability to the first sections 310 of the body 305. The second section wall 460 can be substantially perpendicular to the first parallel wall 465 (or the first wall 420) and the second parallel wall 470 (or the second wall 425).

The body 305 can include at least one extension 440 that protrudes from an outer wall of the body 305 to facilitate orienting or positioning the body 305 relative to the vehicle 105. For example, the extension 440 can act as a datum feature for aligning the body 305 or another portion of the apparatus 300 with a portion of the vehicle 105. The extension 440 can facilitate reducing relative movement between the body 305 and the vehicle 105 when the body 305 is coupled with the vehicle 105.

Figure 6:
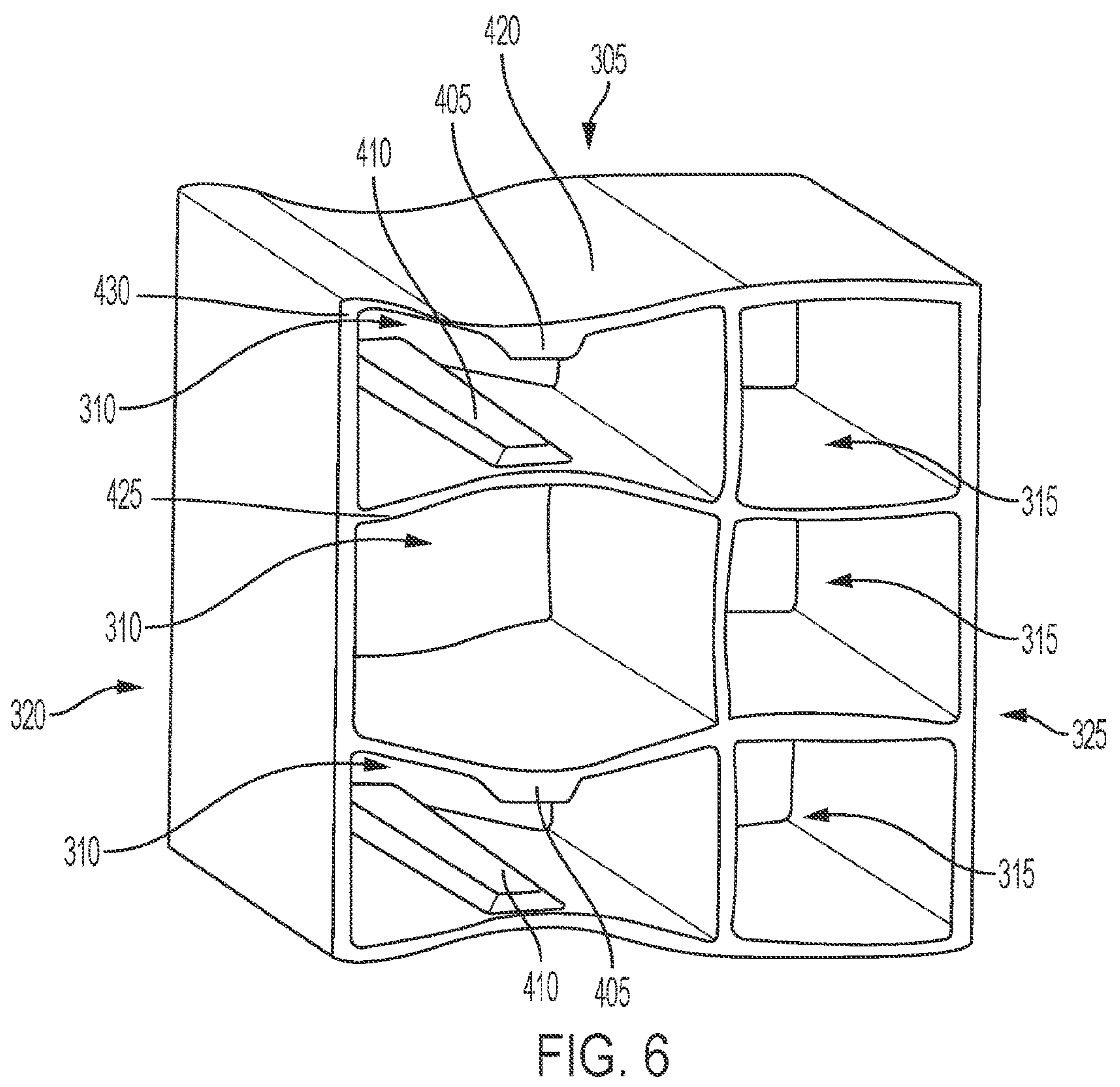
FIG. 6 depicts an example perspective view of a portion of the apparatus of FIG. 3 in a first state, in accordance with implementations.

FIG. 6 depicts the body 305 at a first instance of time in which a force is applied to the body 305 (e.g., in a general direction from left to right). As depicted in FIG. 6, at the time at which a force is applied on the body 305, the walls 420, 425 of the first section 310 begin to move towards each other. FIG. 7 depicts the body 305 at a second time instance in which the force has been applied to the body 305 (e.g., in a general direction from left to right). For example, the second time instance can be later than the first time instance. As depicted in FIG. 7, the walls 420, 425 of the first section 310 can move towards each other such that at least a portion of the walls (e.g., a first protrusion 405 and second protrusion 410) can at least partially contact one another. The first wall 420 and the second wall 425 can move towards each other such that at least a portion of the first section 310 forms a triangular region defining at least one angle 705 between the third wall 430 and the first wall 420. The size and shape of the first sections 310 can differ or vary such that the angle 705 is in the range of 1 degree and 89 degrees. For example, the angle 705 can be in the range of 15 degrees and 75 degrees (e.g., 25 degrees, 35 degrees, 45 degrees, etc.). The angle 705 when the first protrusion 405 contacts the second protrusion 410 can facilitate distributing a load of the force applied on the body 305 throughout the body 305. For example, as the angle 705 increases, the ability of the section 310 to react against the force on the body 305 decreases until the contact of the protrusions 405, 410 provides a stable triangular section 310.

Figure 8:
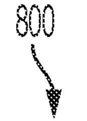
FIG. 8 depicts an example illustration of a process, in accordance with implementations.
Figure 8:
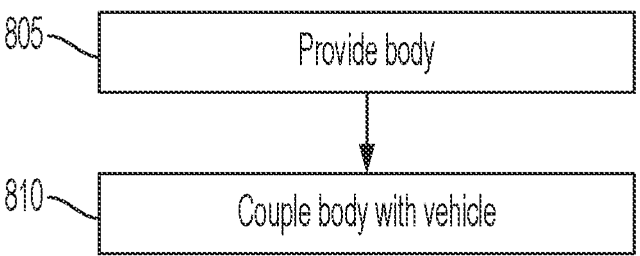

FIG. 8 depicts an example method 800 of installing the body 305 within a vehicle 105. The method 800 can include providing the body 305, as depicted in act 805. Providing the body 305 can include receiving the body 305 after the body 305 is manufacturing (e.g., via extrusion). Providing the body 305 can include manufacturing the body 305 (e.g., via extrusion or various other processes). The body 305 can include a plurality of walls that define one or more first sections 310. At least two walls of the body 305 (e.g., the first wall 420 and second wall 425) can be structured to bow and move towards one another when a force is applied to the body 305. For example, the first wall 420 can include a first plurality of divots 415 that reduce a stiffness of the first wall 420 (e.g., relative to a wall without divots, such as a planar wall of the same thickness) and at least partially bias the first wall 420 towards the second wall 425. The second wall 425 can include a second plurality of divots 415 that reduce a stiffness of the second wall 425 and at least partially bias the second wall 425 towards the first wall 420.

The first wall 420 can include a first protrusion 405 extending from an inner surface of the first wall 420 towards the second wall 425. The second wall 425 can include a second protrusion 410 extending from an inner surface of the second wall 425 towards the first wall 420. The bowed first wall 420 and the bowed second wall 425 can move towards one another when a force is applied on the body 305 such that the first protrusion 405 can contact the second protrusion 410. The contact between the first protrusion 405 and the second protrusion 410 can facilitate distributing the load of the force applied to the body 305 throughout the body 305 and providing stability to the body 305 to absorb energy.

The method 800 can include coupling the body 305 with a portion of the vehicle 105, as depicted at act 810. For example, the body 305 can form or can couple with a portion of a frame rail 160 positioned in the vehicle 105 adjacent or near the battery pack 110 of the vehicle 105 (e.g., between the battery pack 110 and an exterior of the vehicle 105). The body 305 can couple with the vehicle 105 in various ways including, but not limited to, with various types of fasteners. For example, the body 305 can form or can couple with a portion of a rocker panel of the vehicle 105.

Figure 9:
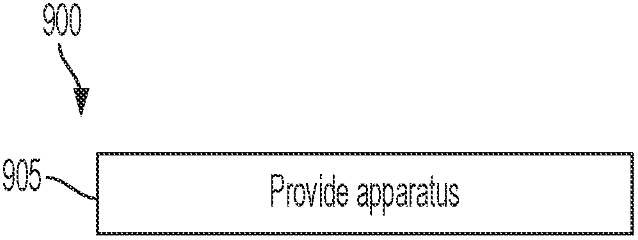
FIG. 9 depicts an example illustration of a process, in accordance with implementations.

FIG. 9 depicts an example method 900. The method 900 can include providing the apparatus 300, as depicted in act 905. The apparatus 300 can include at least one body 305. The body 305 can include a plurality of walls that define one or more first sections 310 along a height or length direction of the body 305. At least two walls of the body 305 (e.g., first wall 420 and second wall 425) can be structured to bow and move towards one another when a force is applied to the body 305. For example, the first wall 420 can include a first plurality of divots 415 that reduce a stiffness of the first wall 420 (e.g., relative to a wall without divots, such as a planar wall) and at least partially bias the first wall 420 towards the second wall 425. The second wall 425 can include a second plurality of divots 415 that reduce a stiffness of the second wall 425 and at least partially bias the second wall 425 towards the first wall 420.

The first wall 420 can include a first protrusion 405 extending from an inner surface of the first wall 420 towards the second wall 425. The second wall 425 can include a second protrusion 410 extending from an inner surface of the second wall 425 towards the first wall 420. The bowed first wall 420 and the bowed second wall 425 can move towards one another when a force is applied on the body 305 such that the first protrusion 405 can contact the second protrusion 410. The contact between the first protrusion 405 and the second protrusion 410 can facilitate distributing the load of the force applied to the body 305 throughout the body 305 and providing stability to the body 305 to absorb energy.

The apparatus 300 can include at least one second section 315 positioned substantially adjacent to at least one first section 310 of the body 305. The second section 315 can include at least one wall having a higher stiffness than at least one wall of the first section 310 (e.g., the first wall 420). The second section 315 can include at least one wall having a greater thickness than at least one wall of the first section 310 (e.g., the second section wall 460 can be thicker than the first wall 420). The second section 315 can include a lower aspect ratio than the first section 310. The second section 315 can define a generally rectangular shape. The second section 315 can be disposed between the first section 310 and a battery pack 110 of a vehicle 105. For example, at least a portion of the apparatus 300 can couple with a frame rail 160 of a vehicle 105 to absorb energy of a force applied to the body 305 to reduce or eliminate a force applied to the battery pack 110 (e.g., such that the battery pack 110 is not deformed or damaged).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, the body can include more or less sections than shown in the figures. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. An apparatus, comprising:

a body having a plurality of walls dividing the body into a plurality of sections along a height of the body;

a first wall and an opposing second wall defining a section of the plurality of sections, a middle portion of the first wall disposed closer to the second wall in a first direction than an end portion of the first wall;

the first wall having a plurality of divots extending along a length of the body;

the first wall and the second wall to move towards each other in the first direction in response to a force applied on the body in a second direction;

the first wall comprising a first protrusion and the second wall comprising a second protrusion; and the first protrusion to contact the second protrusion in response to the force.

2. The apparatus of claim 1, comprising:

the section further comprising a third wall connected to the first wall and the second wall, the third wall to receive a first force as the first wall and the second wall move toward each other and a second force after the first protrusion of the first wall contacts the second protrusion of the second wall; and the first force differing from the second force.

3. The apparatus of claim 1, comprising:

the plurality of sections comprising a plurality of first sections;

the body comprising a plurality of second sections; and each of the plurality of first sections having an adjoining wall of the plurality of walls with one of the plurality of second sections.

4. The apparatus of claim 1, comprising:

the plurality of sections comprising a plurality of first sections;

the body comprising a plurality of second sections, each of the plurality of second sections comprising a plurality of parallel walls;

a first parallel wall of the plurality of parallel walls joined at an end of the first wall of the section; and a second parallel wall of the plurality of parallel walls joined at an end of the second wall of the section.

5. The apparatus of claim 1, comprising:

the plurality of sections comprising a plurality of first sections; and the body comprising a plurality of second sections monolithically formed with the plurality of first sections.

6. The apparatus of claim 1, comprising:

the plurality of sections comprising a plurality of first sections; and a plurality of second sections disposed adjacent to the plurality of first sections.

7. The apparatus of claim 1, comprising:

the body comprising an extrusion.

8. The apparatus of claim 1, comprising:

the body comprising a frame rail positioned adjacent a battery.

9. The apparatus of claim 1, comprising:

the plurality of sections comprising a plurality of first sections;

a plurality of second sections coupled with the body; and the plurality of second sections comprising a different material than the plurality of first sections.

10. A vehicle, comprising:

an apparatus, comprising:

a body having a plurality of walls dividing the body into a plurality of sections along a height of the body;

a first wall and an opposing second wall defining a section of the plurality of sections, a middle portion of the first wall disposed closer to the second wall in a first direction than an end portion of the first wall;

the first wall having a plurality of divots extending along a length of the body;

the first wall and the second wall to move towards each other in the first direction in response to a force applied on the body in a second direction;

the first wall comprising a first protrusion and the second wall comprising a second protrusion; and the first protrusion to contact the second protrusion in response to the force.

11. The vehicle of claim 10, comprising:

the section further comprising a third wall connected to the first wall and the second wall, the third wall to receive a first force as the first wall and the second wall move toward each other and a second force after the first protrusion of the first wall contacts the second protrusion of the second wall; and the first force differs from the second force.

12. The vehicle of claim 10, comprising:

the plurality of sections comprising a plurality of first sections;

the body comprising a plurality of second sections; and each of the plurality of first sections having an adjoining wall of the plurality of walls with one of the plurality of second sections.

13. The vehicle of claim 10, comprising:

the plurality of sections comprising a plurality of first sections;

the body comprising a plurality of second sections, each of the plurality of second sections comprising a plurality of parallel walls;

a first parallel wall of the plurality of parallel walls joined at an end of the first wall of the section; and a second parallel wall of the plurality of parallel walls joined at an end of the second wall of the section.

14. The vehicle of claim 10, comprising:

the plurality of sections comprising a plurality of first sections; and the body comprising a plurality of second sections monolithically formed with the plurality of first sections.

15. The vehicle of claim 10, comprising:

the plurality of sections comprising a plurality of first sections; and a plurality of second sections disposed adjacent to the plurality of first sections.

16. The vehicle of claim 10, comprising:

the body comprising an extrusion.

17. An apparatus, comprising:

a body having a plurality of walls dividing the body into a plurality of first sections and a plurality of second sections;

a first wall and an opposing second wall defining a section of the plurality of first sections, a middle portion of the first wall disposed closer to the second wall in a first direction than an end portion of the first wall;

the first wall having a plurality of divots extending along a length of the body;

the first wall and the second wall to move towards each other in the first direction in response to a force applied on the body in a second direction;

the first wall comprising a first protrusion and the second wall comprising a second protrusion; and the first protrusion to contact the second protrusion in response to the force.

18. The apparatus of claim 1, comprising:

each of the plurality of divots comprises a slot;

a first divot of the plurality of divots is disposed on a first side of the first protrusion; and a second divot of the plurality of divots is disposed on a second side of the first protrusion.

19. The vehicle of claim 10, comprising:

each of the plurality of divots comprises a slot;

a first divot of the plurality of divots is disposed on a first side of the first protrusion; and a second divot of the plurality of divots is disposed on a second side of the first protrusion.

20. The apparatus of claim 17, comprising:

each of the plurality of divots comprises a slot;

a first divot of the plurality of divots is disposed on a first side of the first protrusion; and a second divot of the plurality of divots is disposed on a second side of the first protrusion.

* * * * *